Sept. 3, 1946.    W. W. WARNER    2,407,117

QUICK REVERSING CAPACITOR MOTOR

Filed Feb. 26, 1945

Inventor:
Wilbur W. Warner,
by *Harry E. Dunham*
His Attorney.

Patented Sept. 3, 1946

2,407,117

UNITED STATES PATENT OFFICE 2,407,117

QUICK REVERSING CAPACITOR MOTOR

Wilbur W. Warner, Fort Wayne, Ind., assignor to General Electric Company, a corporation of New York Application February 26, 1945, Serial No. 579,703

5 Claims. (Cl. 172—279)

My invention relates to quick reversing capacitor start motors of the type utilizing regenerative braking and plugging during the reversing operation and employing a speed responsive switch, relay means, and a reversing switch for the control thereof. Apparatus of this type is described in a copending application Serial No. 521,516, filed February 8, 1944, to Fred W. Suhr and myself, now Patent No. 2,380,270, July 10, 1945, assigned to the same assignee as the present invention. In said prior application the same relay was depended upon to shift from running to regenerative connections for both directions of motor rotation and as a result, the connections could be changed at a rate no faster than the dropout action of such relay and necessitated a slight delay in operating the reversing switch in order to prevent reenergizing the motor from the line instead of establishing the reversing connections. The present invention relates primarily to the use of separate relays for the different directions of rotation and their connections which permit of the instantaneous operation of the reversing switch without danger of improper operation of the reversing control and a correspondingly quicker motor reversing action.

Figure 1:
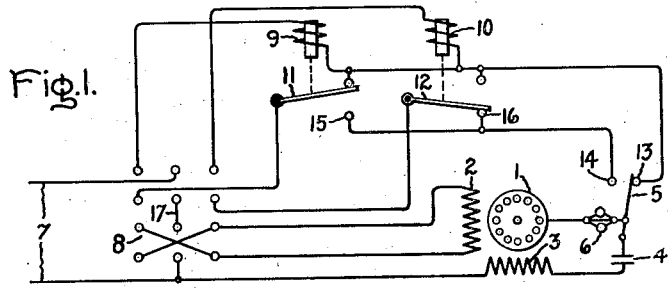
Figure 2:
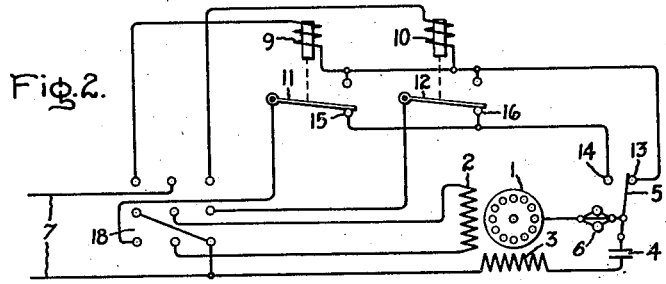
Figure 3:
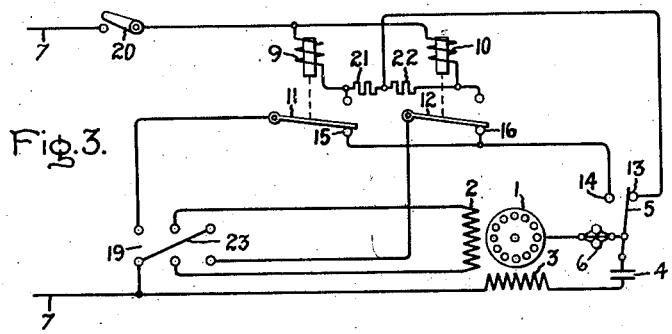

The features of my invention which are believed to be novel and patentable will be pointed out in the claims appended hereto. For a better understanding of my invention, reference is made in the following description to the accompanying drawing in which Fig. 1 represents an embodiment of my invention employing a four-pole reversing and control switch. Fig. 2 is essentially the same as Fig. 1 except using a three-pole reversing and control switch. In Figs. 1 and 2 the reversing switch is used as the motor line switch. Fig. 3 shows a modification of the invention using a two-pole reversing switch and a separate line switch, and in Fig. 4 a two-pole reversing control line switch is used in conjunction with a motor having two main field windings separately employed for the opposite directions of motor operation. In all cases separate relays are used for the opposite directions of motor rotation, and the reversing switch is instantaneously reversible, and hence can be a snap action switch operated either automatically or manually.

The motor with which my invention is employed may have a squirrel cage rotor 1, a main or running field winding 2, and a starting field winding 3 in the circuit of which is a capacitance 4 for producing the desired shift in phase of the fluxes of the two motor windings which are wound in quadrature axes. The starting winding circuit includes an automatic switch 5 which may be operated by a speed responsive centrifugal device 6 for opening the starting winding circuit after the motor has started and reached a suitable speed so that the motor runs single phase on the main winding alone. At start the two winding circuits are energized in parallel from the source of supply 7 through the switch 8 which is represented in Fig. 1 as being a four-pole, double-throw switch with the movable switch blades omitted in order more clearly to show the terminal connections.

The switch 8 is provided with connections to line terminals 7 and hence to the end of the start winding connected to the lower line terminal, to the main winding 2 for energizing and reversing the same, to the starting winding circuit through the coils of relays 9 and 10 and to the movable switch contacts 11 and 12 of such relays. Relay 9 is energized by the starting winding current when the switch 8 is closed to the left and the speed responsive switch 5 is in the start position on contact 13 as represented. It is noted that the position of the reversing switch 8 selects the relay which is initially energized by the starting winding current. Under these conditions the movable switch blade of relay 11 is in the upper position shown in Fig. 1 and completes the energizing circuit of the main winding through the energizing coil of relay 9, and the main winding running current thus holds the relay in energized position after the starting winding circuit is opened by movement of the switch blade 5 to a running contact 14. The lower contacts shown at 15 and 16 of the relays are both connected to the running contact 14 of the speed responsive switch, and these connections are used for establishing regenerative braking circuits for the motor in the early part of reversing operations. The significance of the connections will be evident from the following description of the operation for the different directions of rotation.

To start the motor in a given direction, say counterclockwise, the switch 8 is closed to the left. This closes a circuit for the start winding from the lower line terminal 7, winding 3, condenser 4, speed responsive switch 5 on contact 13, relay coil 9 through the upper blade of switch 8 to the upper line terminal 7. The current of the starting winding circuit flowing through the selected relay coil 9 causes its movable contactor 11 to rise to the upper stationary contact, whereupon a circuit for the main winding is established as follows: From lower line terminal, the lower blade of switch 8, winding 2, the lower center blade of switch 8, a connection 17, the upper center blade of switch 8, movable contact 11 of selected relay 9 in the upper position, coil of relay 9, upper blade of switch 8 to the upper line terminal. The motor thus starts and comes up to speed, and the speed responsive switch 5 moves to running contact 14, thereby opening the starting winding circuit and connecting this end of the starting winding circuit to contact 14. Relay 9 remains energized because of the main winding current through its coil. No complete circuit is established through contact 14 and the speed responsive switch at this time and hence the motor runs single phase on winding 2 alone. The motor may be stopped slowly by simply opening switch 8. To reverse quickly, switch 8 is thrown from closed position to the left to closed position to the right. This interrupts the main winding energizing circuit and establishes a closed regenerative braking circuit through the main and start windings and condenser traced as follows: From lower blade of switch 8, start winding 3, condenser 4, switch 5 on contact 14, lower contact 16 and movable contact 12 of relay 10, upper center blade of switch 8, connection 17, lower center blade of switch 8, main winding 2, back to lower blade of switch 8. It will be noted that to establish this regenerative braking circuit, the switch 8 may be reversed instantaneously or as fast as it is possible to do so with any kind of switch including an electronic switch, and does not depend upon the dropping out of relay 9, since the necessary regenerative braking circuit, except through switch 8, was already set up through contactor 12 resting on its lower contact 16, and contacts 14 and 5, the then idle start winding 3 and capacitance 4. The motor thus quickly reduces speed until the speed responsive switch 5 returns to the starting contact 13. It will be noted that when switch 8 was reversed, the connections thereto from main winding 2 were also reversed; hence, when the speed responsive switch moves to the start contact 13, the motor becomes connected for the reverse direction of rotation as follows: From lower line terminal, start winding 13, condenser 4, switch 5, contact 13, coil of relay 10, upper blade of switch 8 to the right to the upper line terminal; relay 10, which is now selected by the position of the reversing switch, pulls up and completes the main winding energizing circuit as previously described except that now switch 8 is closed to the right and relay 10 instead of 9 is used. Since the motor is still running counterclockwise, it is plugged and quickly stops and reverses, and comes up to speed in a clockwise direction. The speed responsive switch moves to the running contact, cutting out the start winding, and the motor runs single phase on the main winding alone with its current flowing through the coil of selected relay 10, establishing a holding-in circuit for such relay. During the described reversing operation the relay 9 has of course dropped out, and its movable contact is now in the lower position but at no time during the reversing operation does it establish any complete circuit but does partially set up or partially establish the regenerative braking circuit to be completed and used when reversing from clockwise to counterclockwise operation, by throwing switch 8 from closed position at the right to closed position at the left. The regenerative braking, plugging and starting, when changing from clockwise to counterclockwise operation, are the same as above described except that switch 8 is thrown from right to left and relay 9 is used instead of relay 10. While switch 8 may be reversed instantaneously, which is very desirable in many cases, no difficulty will arise by reason of slow operation of this switch, and by proper manipulation of switch 8 either the step of regenerative braking, or plugging, or both steps, may be omitted.

Fig. 2 operates the same as Fig. 1. However, in Fig. 2 a three-pole double-throw switch 18 is substituted for switch 8 of Fig. 1, the elimination of one switch blade made possible by a rearrangement of the switch connections which are fully illustrated in Fig. 2.

In Fig. 3 I have represented an embodiment of my invention which may be desirable in some cases because it uses a two-pole, double-throw reversing switch 19 and a separate energizing switch 20. With switch 19 closed for the desired direction of rotation, the motor is started by closing switch 20. Switch 19 is used for reversing service and may be reversed instantaneously. When the motor is to be shut down, switch 20 is opened. It will be noted that the connection from the starting contact 13 of the speed responsive switch to the coils of relays 9 and 10 is through similar resistances 21 and 22, resistance 21 in series with coil 9, and resistance 22 in series with coil 10; and such two series groups are connected in parallel in the starting winding circuit. As a result, when the motor is started, both relays pull up. The main winding circuit is thus closed through either contactor 11 or 12, depending upon the position of reversing switch 19. For instance, with reversing switch 19 thrown to the left, the main winding is energized through the upper blade of switch 19 and contactor 11 of relay 9. Now, when the speed responsive switch 5 operates and moves to running contact 14, relay 10 will drop out because with respect to the main winding current through contactor 11, both resistances 21 and 22 are in series with the coil of relay 10, whereas neither is in series with the coil of relay 9. Hence, practically all of the main winding current flows through the coil of relay 9 which thus holds in, whereas relay 10 drops out and partially sets up the regenerative braking circuit preparatory to the next reversing operation. Such regenerative braking circuit is completed when switch 19 is reversed or closed to the right and may be traced as follows: From cross-connection 23 of switch 19, winding 3, condenser 4, switch 5, contact 14, contacts 16 and 12 of relay 10 in deenergized position, lower blade of switch 19 closed to the right, winding 2 back to upper blade of switch 19 and cross-connection 23.

When running in the opposite direction, relay 10 is held in by the main winding current, and the reversing regenerative braking will be through the lower contact 15 and movable contactor 11 of relay 9. Thus the operation is essentially the same as in Figs. 1 and 2. The resistances 21 and 22 are relatively low in value and since they are in parallel in the starting winding circuit during the short starting period, offer no difficulty.

Figure 4:
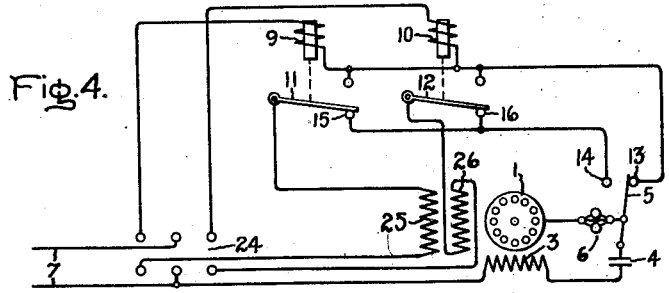

In Fig. 4 the operating results previously described are obtained by the use of a combined line and reversing double-pole, double-throw switch 24 and the use of a motor with two main field windings 25 and 26 wound or connected for opposite directions of motor operation in conjunction with the relays 9 and 10 and their connections as illustrated. The motor is started by closing switch 24 in a direction determined by the direction of rotation desired. Assume the switch 24 is closed to the left, relay 9 is energized and pulls in and main winding 25 is thus energized while relay 10 remains deenergized to partially establish the regenerative braking circuit which will use now idle main winding 26. When switch 24 is now reversed, regenerative braking occurs by reason of circulation of current through the following circuit: lower blade of switch 24, winding 3, condenser 4, switch 5 on its running contact 14, lower contact and movable contactor 12 of relay 10, main winding 26, back to the lower blade of switch 24. As soon as the speed responsive switch moves to the starting contact 13, plugging followed by starting in the opposite direction is obtained, using main winding 26 energized through relay 10 in the pulled-in position. In the meantime relay 9 has dropped out preparatory to regenerative braking and will use main winding 25 when switch 24 is again thrown to the left to reverse the motor. The form of the invention of Fig. 4 may be useful where the load of the motor is somewhat different for the opposite directions of rotation, which can be taken care of by suitable differences in the two main windings. Also, the switch 24 employed in Fig. 4 is of standard type readily available and requires reduced space as compared to the other arrangements.

What I claim as new and desire to secure by Letters Patent of the United States is:

1. A quick reversing capacitor motor having displaced main and start field windings, capacitance in series with the start winding, an automatic switch for opening the starting winding circuit when the motor comes up to speed during a starting operation, said switch having a running contact to which one end of the starting winding circuit then becomes connected, a pair of relays at least one of which is adapted to be energized through the automatic switch during the starting operation, said relays both having a movable contact and stationary contacts for establishing holding-in circuits for the relays when energized and connections to said running contacts when deenergized, a double-throw reversing switch for reversing the motor by reversal of the main field of the motor, said switch establishing a connection to the other end of the starting winding circuit in both of its reversing positions, to the movable contact of one of said relays in one of its reversing positions and to the movable contact of the other of said relays in its other reversing position, energizing terminals for said motor so arranged that the energizing current for the main winding of the motor flows through one or the other of said relays depending upon the position of the reversing switch, and constitutes the holding-in current of such relay and prevents it dropping out when the automatic switch opens the starting winding circuit during a starting operation, said other relay (in deenergized position) and automatic switch (on its running contact) then partially establishing a regenerative braking circuit for the motor wherein the main and start motor windings and capacitance are connected in series, which circuit is completed upon reversal of the reversing switch.

2. A quick reversing capacitor motor having displaced main and start windings, capacitance in series with the start winding, an automatic switch for opening the starting winding circuit when the motor comes up to speed during a starting operation, said switch having a running contact to which one end of the starting winding circuit then becomes connected, a pair of relays a selected one of which is energized through the automatic switch during the starting operation, said relays both having a movable contact and stationary contacts for establishing holding-in circuits for the relays when energized and connections to said running contacts when deenergized, a double-throw reversing switch associated with the main windings for reversing the motor, said switch establishing a connection to the other end of the starting winding circuit in both of its reversing positions, to the movable contact of one of said relays in one of its reversing positions and to the movable contact of the other of said relays in its other reversing position, energizing terminals for said motor and relays also connected through said reversing switch and so arranged that the position of the reversing switch selects the relay to be energized during a starting operation and the energizing current for the main winding of the motor flows through the selected relay, and constitutes the holding-in current of such relay and prevents such relay from dropping out when the automatic switch opens the starting winding circuit during a starting operation, said other relay (in deenergized position) and automatic switch (on its running contact) then partially establishing a regenerative braking circuit for the motor wherein the main and start motor windings and capacitance are connected in series, which circuit is completed upon reversal of the reversing switch.

3. A quick reversing capacitor motor having displaced main and start windings, capacitance in series with the start winding, an automatic switch for opening the starting winding circuit when the motor comes up to speed during the starting operation, said switch having a running contact to which one end of the starting winding circuit then becomes connected, a pair of relays, a connection made by the automatic switch when in starting position to one energizing terminal of each relay through which a selected one of such relays is energized during the starting operation, said relays both having a movable contact and stationary contacts for establishing holding-in circuits for the relays when energized and connections to said running contact when deenergized, a double-throw reversing switch associated with the main winding of the motor for reversing the motor and through which the motor and relays are energized, said switch having connections to the other terminals of said relays arranged to select the relay to be energized through the automatic switch during a starting operation depending upon the position of the reversing switch, said reversing switch also establishing connections to the other end of the starting winding circuit and to the movable contacts of the selected relay in the two reversing positions of the reversing switch such that energizing current for the main winding flows through the selected relay and constitutes the holding-in current for such relay during single phase operation, said other relay (in deenergized position) and the automatic switch (on its running contact) then partially establishing a regenerative braking circuit for the motor wherein the main and start motor windings and capacitance are connected in series, which circuit is completed upon reversal of the reversing switch.

4. A quick reversing capacitor motor having displaced main and start windings, capacitance in series with the start winding, an automatic switch for opening the starting winding circuit when the motor comes up to speed during a starting operation, said switch having a running contact to which one end of the starting winding circuit then becomes connected, a pair of relays, an impedance connected between one pair of energizing terminals of said relay through which both relays are energized in parallel through the automatic switch during the starting operation, said relays both having a movable contact and stationary contacts for establishing holding-in circuits for the relays when energized and connections to said running contacts when deenergized, a double-throw reversing switch associated with the main windings for reversing the motor, said switch establishing a connection to the other end of the starting winding circuit in both of its reversing positions, to the movable contact of one of said relays in one of its reversing positions and to the movable contact of the other of said relays in its other reversing position, a pair of energizing terminals for said motor, one terminal being connected to said reversing switch and to said start winding, a line switch between the other line terminal and the other pair of energizing terminals of said relays whereby the energizing current for the main winding of the motor flows through one or the other of said relays depending upon the position of the reversing switch, and constitutes the holding-in current of such relay, whereas the other relay drops out when the automatic switch opens the starting winding circuit during a starting operation, said other relay (in deenergized position) and automatic switch (on its running contact) then partially establishing a regenerative braking circuit for the motor wherein the main and start motor windings and capacitance are connected in series, which circuit is completed upon reversal of the reversing switch.

5. A quick reversing capacitor motor having first and second main field windings and a displaced starting field winding, the first main winding being used for motor operation in a clockwise direction and regenerative braking in a counterclockwise direction and the second main winding being used for motor operation in a counterclockwise direction and for regenerative braking in a clockwise direction, a capacitance in series with the start winding, an automatic switch for opening the starting winding circuit when the motor comes up to speed during a starting operation, said switch having a running contact to which one end of the start winding becomes connected when the motor is up to speed, a pair of relays, one or the other of which is selectively energized through the automatic switch during the starting operation depending upon the position of a later mentioned reversing switch, said relays both having a movable contact and stationary contacts for establishing holding-in circuits for the relays when energized and connections to said running contact when deenergized, a double-throw energizing and reversing switch for the motor, said switch having connections to energizing terminals and to the other end of the starting winding circuit in both positions, a connection through one main winding to the movable contact of one relay and an energizing connection to such relay in one reversing position and through the other main winding to the movable contact of the other relay and an energizing connection to such other relay in the other reversing position whereby the main winding energizing current becomes the holding-in current for the selected relay to which such winding is connected depending upon the position of the motor reversing switch, the energized relay and automatic switch (on its running contact) then partially establishing a regenerative braking circuit for the motor in which the now idle windings of the motor and capacitance are connected in series, which circuit is completed upon reversal of the reversing switch.

WILBUR W. WARNER.